(12) United States Patent
Li et al.

(10) Patent No.: US 10,903,897 B2
(45) Date of Patent: Jan. 26, 2021

(54) CONTROL METHOD, UNMANNED AERIAL VEHICLE, AND REMOTE CONTROL DEVICE

(71) Applicant: SZ DJI TECHNOLOGY CO., LTD., Shenzhen (CN)

(72) Inventors: Dong Li, Shenzhen (CN); Renqin Deng, Shenzhen (CN); Jianping Wei, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/518,955

(22) Filed: Jul. 22, 2019

(65) Prior Publication Data
US 2019/0349076 A1 Nov. 14, 2019

Related U.S. Application Data

(63) Continuation of application No. PCT/CN2017/072265, filed on Jan. 23, 2017.

(51) Int. Cl.
*H04B 7/005* (2006.01)
*H04B 7/185* (2006.01)
*B64C 39/02* (2006.01)
*G05D 1/00* (2006.01)

(52) U.S. Cl.
CPC ....... *H04B 7/18532* (2013.01); *B64C 39/024* (2013.01); *G05D 1/0022* (2013.01); *B64C 2201/146* (2013.01)

(58) Field of Classification Search
CPC . H04W 52/325; H04W 84/18; H04W 52/146; H04W 52/367; H04W 52/242; H04W 40/246; H04W 52/241; H04W 52/327
USPC .................................. 455/501, 127.1, 127.2
See application file for complete search history.

(56) References Cited

U.S. PATENT DOCUMENTS 9,415,869 B1 8/2016 Chan et al.
2017/0192418 A1* 7/2017 Bethke ................. G08G 5/0013

FOREIGN PATENT DOCUMENTS

| CN | 103024889 A | 4/2013 |
|---|---|---|
| CN | 104469920 A | 3/2015 |
| CN | 204190887 U | 3/2015 |
| CN | 104978839 A | 10/2015 |
| CN | 105430731 A | 3/2016 |
| CN | 105549402 A | 5/2016 |

(Continued)

OTHER PUBLICATIONS

World Intellectual Property Organization (WIPO) International Search Report for PCT/CN2017/072265 dated Oct. 23, 2017 6 pages.

*Primary Examiner* — Tu X Nguyen
(74) *Attorney, Agent, or Firm* — Anova Law Group, PLLC

(57) ABSTRACT

A method is provided for controlling a signal transmission power of at least one of an unmanned aerial vehicle ("UAV") or a remote control device. The method includes determining whether a remote control distance between the UAV and the remote control device increases or decreases. The method also includes increasing or maintaining a signal transmission power of at least one of the UAV or the remote control device if the remote control distance increases. The method further includes decreasing or maintaining the signal transmission power of at least one of the UAV or the remote control device if the remote control distance decreases.

19 Claims, 14 Drawing Sheets

(56) References Cited

FOREIGN PATENT DOCUMENTS

| | | | |
|---|---|---|---|
| CN | 105657809 | A | 6/2016 |
| CN | 105843246 | A | 8/2016 |
| CN | 105843254 | A | 8/2016 |
| JP | 2011232927 | A | 11/2011 |

* cited by examiner

CONTROL METHOD, UNMANNED AERIAL VEHICLE, AND REMOTE CONTROL DEVICE

CROSS-REFERENCE TO RELATED APPLICATION

This application is a continuation application of International Application No. PCT/CN2017/072265, filed on Jan. 23, 2017, the entire content of which is incorporated herein by reference.

TECHNICAL FIELD

The present disclosure relates to the technology field of consumer electronics and, more particularly, to a control method, an unmanned aerial vehicle, and a remote control device.

BACKGROUND

Radio frequency signals of an unmanned aerial vehicle ("UAV") and a remote control device may be transmitted at the maximum power, such that good transmission of image signals and control signals at a long distance can be maintained. However, it may be a waste of energy when the flight is at a short distance. In the meantime, maintaining the maximum transmission power for a long time period may bring relatively large electromagnetic radiation effects to human bodies located adjacent to a remote control device, and bring large interferences to the surrounding electromagnetic environment.

SUMMARY

In accordance with an aspect of the present disclosure, there is provided a method for controlling a signal transmission power of at least one of an unmanned aerial vehicle ("UAV") or a remote control device. The method includes determining whether a remote control distance between the UAV and the remote control device increases or decreases. The method also includes increasing or maintaining a signal transmission power of at least one of the UAV or the remote control device if the remote control distance increases. The method further includes decreasing or maintaining the signal transmission power of at least one of the UAV or the remote control device if the remote control distance decreases.

In accordance with another aspect of the present disclosure, there is provided an unmanned aerial vehicle ("UAV"). The UAV includes a processor configured to determine whether a remote control distance between the UAV and a remote control device increases or decreases. The UAV also includes a transmitter configured to increase or maintain a signal transmission power of at least one of the UAV or the remote control device if the remote control distance increases. The transmitter is also configured to decrease or maintain the signal transmission power of at least one of the UAV or the remote control device if the remote control distance decreases.

In accordance with another aspect of the present disclosure, there is provided a remote control device. The remote control device includes a processor configured to determine whether a remote control distance between an unmanned aerial vehicle ("UAV") and the remote control device increases or decreases. The remote control device also includes a transmitter configured to increase or maintain a signal transmission power of at least one of the UAV or the remote control device if the remote control distance increases. The transmitter is also configured to decrease or maintain the signal transmission power of at least one of the UAV or the remote control device if the remote control distance decreases.

According to the control method, UAV, and remote control device of the present disclosure, when a remote control distance between the UAV and the remote control device increases, the UAV and/or the remote control device may be controlled to increase or maintain a signal transmission power respectively. When the remote control distance between the UAV and the remote control device decreases, the UAV and/or the remote control device may be controlled to decrease or maintain the signal transmission power respectively. As such, the transmission power of the UAV and the remote control device may be reduced while maintaining the normal signal transmission between the UAV and the remote control device. On the one hand, energy may be saved for the UAV and the remote control device, avoiding waste. On the other hand, maintaining the maximum power to transmit signals at all time can be avoided, thereby reducing the electromagnetic radiation effects of the transmission power on human bodies located adjacent to the remote control device, as well as reducing interference with the surrounding electromagnetic environment.

Additional aspects and advantages of the technical solutions of the present disclosure will be partially provided in the following descriptions, and partially become obvious from the following descriptions. Alternatively, the additional aspects and advantages of the technical solutions can be understood from practicing the various embodiments of the present disclosure.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

LIST OF MAJOR ELEMENTS

Figure 1:
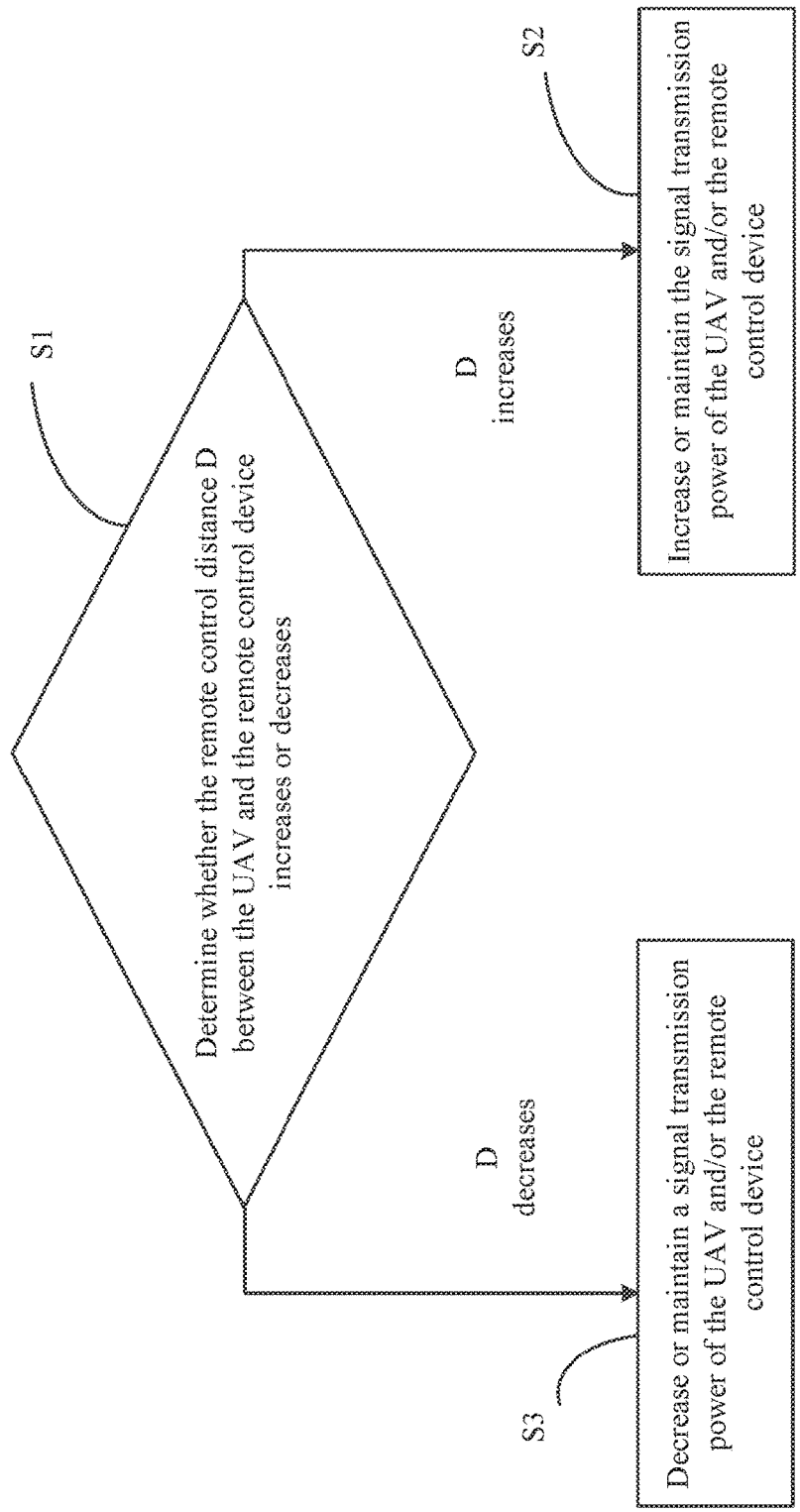
FIG. 1 is a flow chart illustrating a control method, according to an example embodiment.

| | |
|---|---|
| Unmanned aerial vehicle | 100 |
| First processor | 10 |
| First transmitter | 12 |
| First distance detector | 14 |
| Global positioning system | 142 |
| Barometer | 144 |
| First calculator | 146 |
| First storage device | 16 |
| First signal receiver | 18 |
| Remote control device | 200 |
| Second processor | 20 |
| Second transmitter | 22 |
| Distance detector | 24 |
| Horizontal distance acquisition module | 242 |
| Height acquisition module | 244 |
| Second calculator | 246 |
| Second storage device | 26 |
| Second signal receiver | 28 |

DETAILED DESCRIPTION OF THE EMBODIMENTS

Next, the embodiments of the present disclosure will be described in detail. Illustrations of the embodiments are shown in the accompanying drawings. The same or similar reference numerals indicate the same or similar elements or elements having the same or similar functions. The embodiments described below with reference to the accompanying drawings are illustrative, are used to explain the present disclosure, and should not be understood as limiting the present disclosure.

It should be understood that in the present disclosure, relational terms such as "first," "second" are only used for descriptive purposes only, and should not be understood as indicating or implying relative importance or implicitly indicating the quantity of the referenced technical features. As such, a feature modified by the "first" or "second" may indicate or implicitly include one or more such features. In the descriptions of the present disclosure, "multiple" means two or more than two, unless expressly specified otherwise.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

In addition, the singular forms "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The term "and/or" may be interpreted as "at least one of" the related items. For example, A and/or B may be interpreted as at least one of A or B, such as A, B, or A and B. The symbol "/" means "or" between the related items separated by the symbol. The phrase "at least one of A, B, or C" encompasses all combinations of A, B, and C, such as A only, B only, C only, A and B, B and C, A and C, and A, B, and C. In this regard, A and/or B can mean at least one of A or B. The term "module" as used herein includes hardware components or devices, such as circuit, housing, sensor, connector, etc. The term "communicatively couple (d)" or "communicatively connect(ed)" indicates that related items are coupled or connected through a communication channel, such as a wired or wireless communication channel. The term "unit," "sub-unit," or "module" may encompass a hardware component, a software component, or a combination thereof. For example, a "unit," "sub-unit," or "module" may include a processor, a portion of a processor, an algorithm, a portion of an algorithm, a circuit, a portion of a circuit, etc.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions provide various different embodiments or examples for realizing the different structures of the present disclosure. To simplify the description of the present disclosure, components and configurations of specified examples are described. They are only examples and are not intended to limit the scope of the present disclosure. In addition, various embodiments of the present disclosure may use repeated reference numbers and/or reference alphabets. Such repetition is for the purpose of simplification and clarity, and does not indicate any relationship between the various embodiments and/or configurations. Further, the present disclosure provides examples of various processes and materials. A person having ordinary skills in the art can recognize that other processes and/or other materials may be used.

Next, the various embodiments of the present disclosure will be described. The illustrations of the various embodiments are shown in the accompanying drawings. The same or similar reference numerals indicate the same or similar components or components having the same or similar functions. The embodiments described below with reference to the drawings are illustrative only, are used to explain the present disclosure, and should not be understood to limit the scope of the present disclosure.

Figure 2:
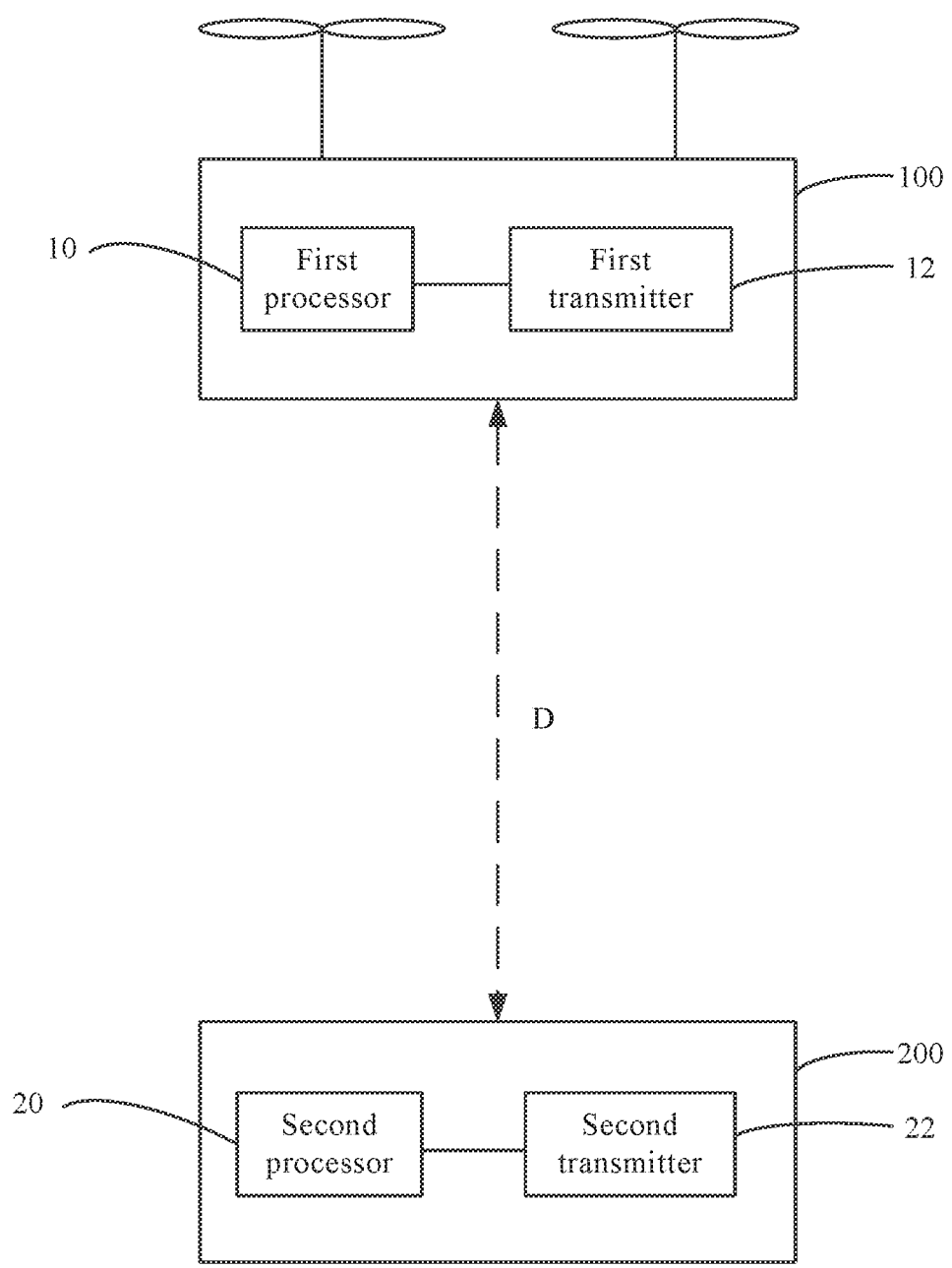
FIG. 2 is a schematic diagram of functional modules of the UAV and the remote control device, according to an example embodiment.

As shown in FIG. 1 and FIG. 2, a control method of the present disclosure may be used to control a signal transmission power of a UAV 100 and/or a remote control device 200. The control method may include the following steps:

S1: determining whether a remote control distance D between the UAV 100 and the remote control device 200 increases or decreased;

S2: when the remote control distance D increases, increasing or maintaining a signal transmission power of the UAV 100 and/or the remote control device 200; and S3: when the remote control distance D decreases, decreasing or maintaining the signal transmission power of the UAV 100 and/or the remote control device 200.

In some embodiments, determining whether the remote control distance D between the UAV 100 and the remote control device 200 increases or decreases may be judged directly based on the distance between the UAV 100 and the remote control device 200. For example, the distance between the UAV 100 and the remote control device 200 may be calculated through a distance detector. In some embodiments, determining whether the remote control distance D between the UAV 100 and the remote control device 200 increases or decreases may be judged from a parameter that can indirectly reflect a distance change between the UAV 100 and the remote control device 200. For example, when the distance between the UAV 100 and the remote control device 200 increases, a signal-to-noise ratio of a signal transmitted between the UAV 100 and the remote control device 200 decreases; when the distance between the UAV 100 and the remote control device 200 decreases, the signal-to-noise ratio of the signal transmitted between the UAV 100 and the remote control device 200 increases. As such, the signal-to-noise ratio of the signal received by the UAV and the remote control device 200 may be used as a parameter that reflects whether the distance between the UAV 100 and the remote control device 200 increases or decreases.

Referring to FIG. 2, the control method may be executed by the UAV 100. In some embodiments, the UAV 100 may include a first processor 10 and a first transmitter 12. The first processor 10 may be configured to execute step S1, and the first transmitter 12 may be configured to execute steps S2 and S3. The first processor 10 and the first transmitter 12 may be electrically connected. The first processor 10 may be configured to control the first transmitter 12 to change a transmission power. In other words, the first processor 10 may be configured to determine whether the remote control distance D between the UAV 100 and the remote control device 200 increases or decreases. The first transmitter 12 may be configured to increase or maintain the signal transmission power of the UAV 100 and/or the remote control device 200 when the remote control distance D increases. The first transmitter 12 may also be configured to decrease or maintain the signal transmission power of the UAV 100 and/or the remote control device 200 when the remote control distance D decreases.

Referring to FIG. 2, the control method may be executed by the remote control device 200. In some embodiments, the remote control device 200 may include a second processor 20 and a second transmitter 22. The second processor 20 may be configured to execute step S1, and the second transmitter 22 may be configured to execute steps S2 and S3. The second processor 20 and the second transmitter 22 may be electrically connected. The second processor 20 may be configured to control the second transmitter 22 to change transmission power. In other words, the second processor 20 may be configured to determine whether the remote control distance D between the UAV 100 and the remote control device 200 increases or decreases. The second transmitter 22 may be configured to increase or maintain the signal transmission power of the UAV 100 and/or the remote control device 200 when the remote control distance D increases. The second transmitter 22 may also be configured to decrease or maintain the signal transmission power of the UAV 100 and/or the remote control device 200 when the remote control distance D decreases. In some embodiments, the remote control device 200 may include any one of terminals having a control function, such as a cell phone, a remote controller, a smart watch, smart glasses, or a smart helmet.

In some embodiments, the control method, UAV 100, and the remote control device 200 may be configured to: when the remote control distance D between the UAV 100 and the remote control device 200 increases, controlling the UAV 100 and/or the remote control device 200 to increase or maintain the signal transmission power respectively; when the remote control distance D between the UAV 100 and the remote control device 200 decreases, controlling the UAV 100 and/or the remote control device 200 to decrease or maintain the signal transmission power respectively. As such, the transmission power of the UAV 100 and/or the remote control device 200 may be reduced while maintaining the normal signal transmission between the UAV 100 and the remote control device 200. On the one hand, energy may be saved for the UAV 100 and the remote control device 200, avoiding waste. On the other hand, maintaining the maximum power to transmit signals at all time can be avoided, thereby reducing the electromagnetic radiation effects of the transmission power on human bodies located adjacent to the remote control device 200, as well as reducing interference with the surrounding electromagnetic environment.

Figure 3:
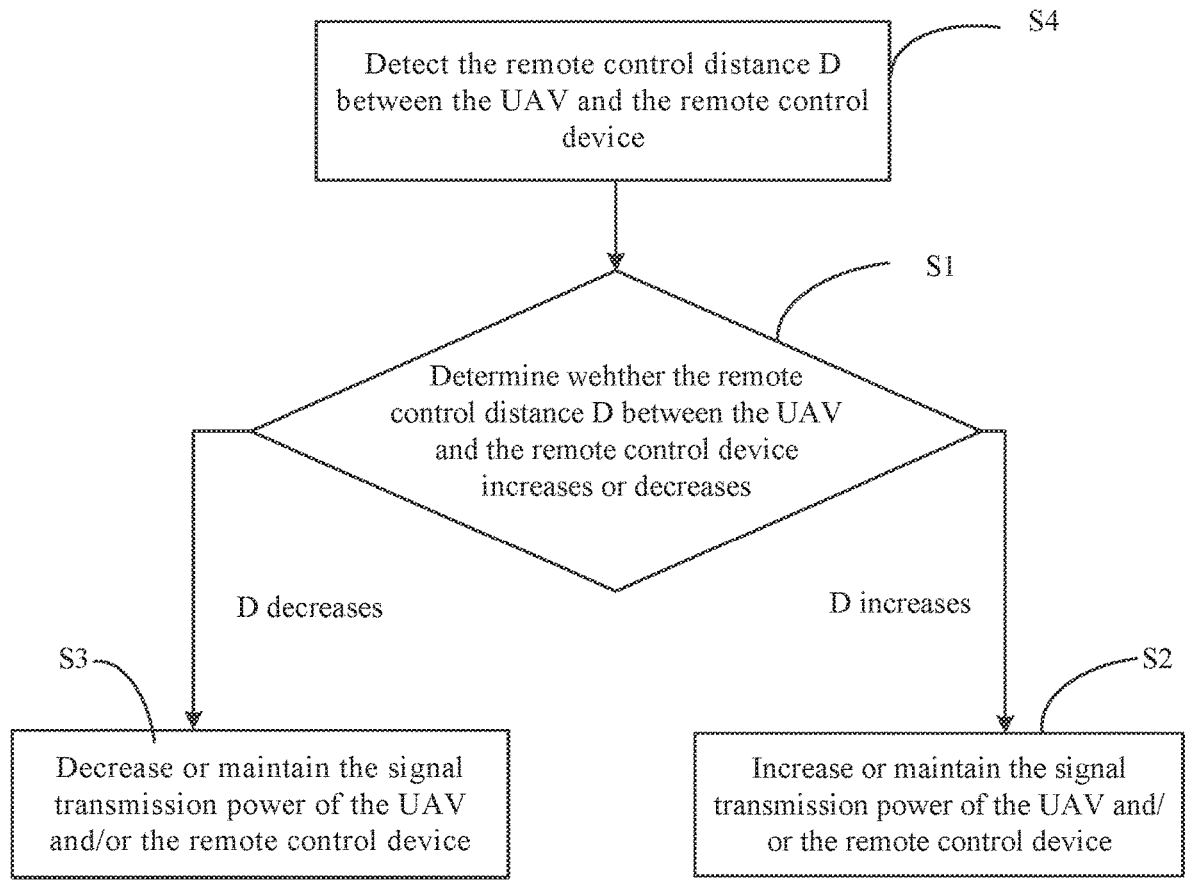
FIG. 3 is a flow chart illustrating a control method, according to another example embodiment.

Referring to FIG. 3, in some embodiments, the control method may also include the following steps:

S4: detecting a remote control distance D between the UAV 100 and the remote control device 200. In some embodiments, the remote control distance between the UAV 100 and the remote control device 200 is a spatial straight distance between the UAV 100 and the remote control device 200. In some embodiments, the control method may first execute step S4, and then execute step S1 and step S2 or S3.

Figure 4:
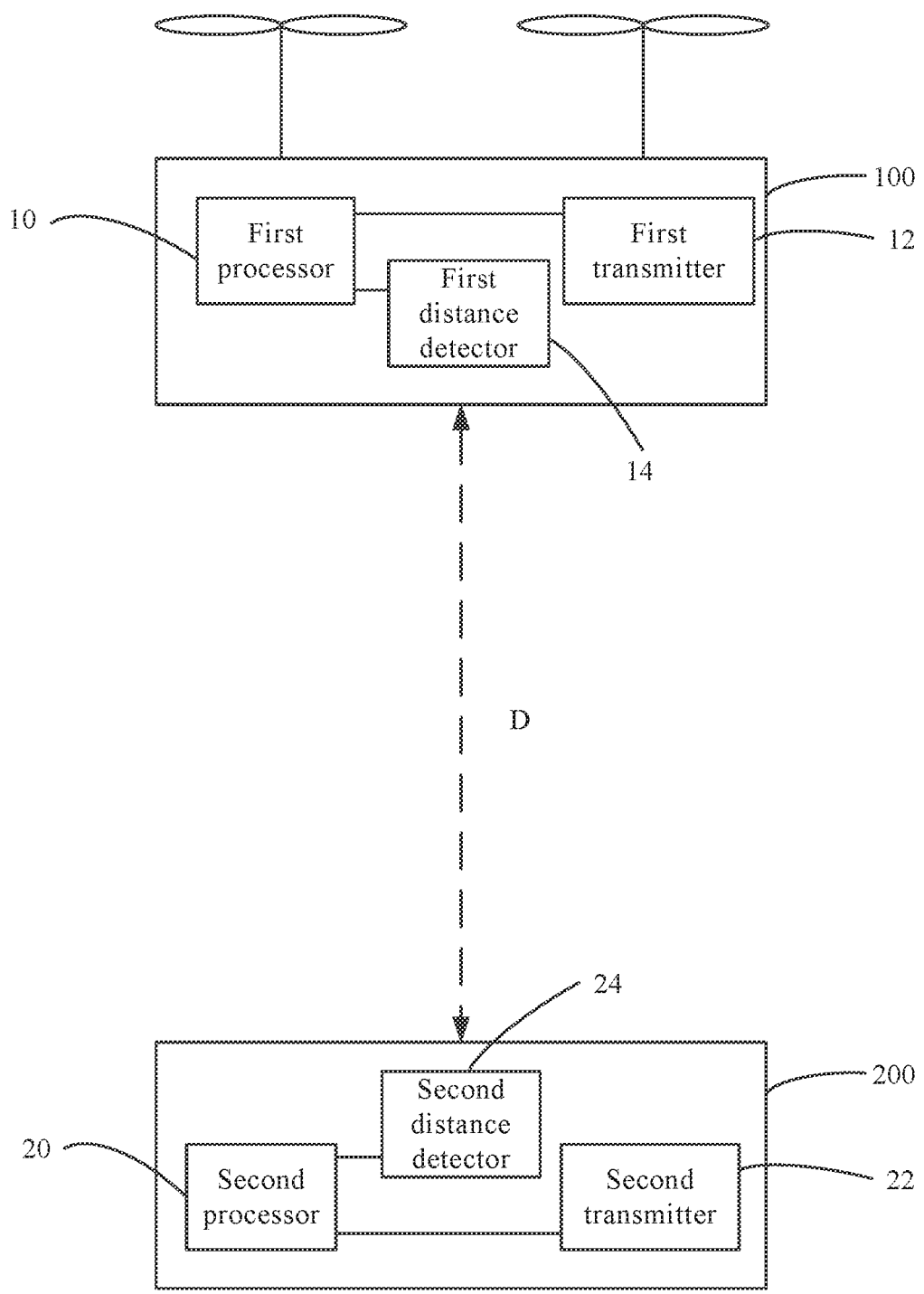
FIG. 4 is a schematic diagram of functional modules of the UAV and the remote control device, according to another example embodiment.

Referring to FIG. 4, the control method may be executed by the UAV 100. In some embodiments, the UAV 100 may include a first distance detector 14 configured to execute step S4. In other words, the first distance detector 14 may be configured to measure or detect the remote control distance D between the UAV 100 and the remote control device 200. The first distance detector 14 and the first processor 10 may be electrically connected. The remote control distance D between the UAV 100 and the remote control device 200 obtained by the first distance detector 14 may be transmitted to the first processor 10.

In some embodiments, the control method may be executed by the remote control device 200. The remote control device 200 may include a second distance detector 24 configured to execute step S4. In other words, the second distance detector 24 may be configured to detect the remote control distance D between the UAV 100 and the remote control device 200. The second distance detector 24 and the second processor 20 may be electrically connected. The remote control distance between the UAV 100 and the remote control device 200 obtained by the second distance detector 24 may be transmitted to the second processor 20.

In some embodiments, the first distance detector 14 and the second distance detector 24 may be distance sensors respectively. In some embodiments, the first distance detector 14 and the second distance detector 24 may both be single component, such as an infrared distance sensor, an ultrasonic distance sensor, a time of flight ("TOF") distance sensor, etc. The remote control distance D between the UAV 100 and the remote control device 200 may be obtained or detected directly through the above distance sensor. In other embodiments, the first distance detector 14 and the second distance detector 24 may each include multiple components, such as a global positioning system, a barometer, and a processor. The remote control distance D between the UAV 100 and the remote control device 200 may be obtained through the multiple components. In some embodiments, the remote control distance D may be obtained through other methods. For example, the UAV 100 may transmit a time signal to the remote control device 200, such as 9:00. The second distance detector 24 may receive the time signal, obtain a time at which the time signal is received, such as 9:05, and calculate a difference between the two time instances (e.g., 5 minutes), and calculate the remote control distance D between the UAV 100 and the remote control device 200 based on a signal transmission speed. In some embodiments, the first distance detector 14 may obtain the remote control distance D through the same method.

As such, the UAV 100 and the remote control device 200 may directly detect the distance between the UAV 100 and the remote control device 200 through the first distance detector 14 and the second distance detector 24, respectively.

In some embodiments, the UAV 100 and the remote control device 200 may respectively detect the distance between them through the first distance detector 14 and the second distance detector 24, respectively. Thus, the UAV 100 and the remote control device 200 may respectively change the transmission power of the UAV 100 and/or the remote control device 200 based on the distance detected by them respectively.

Figure 5:
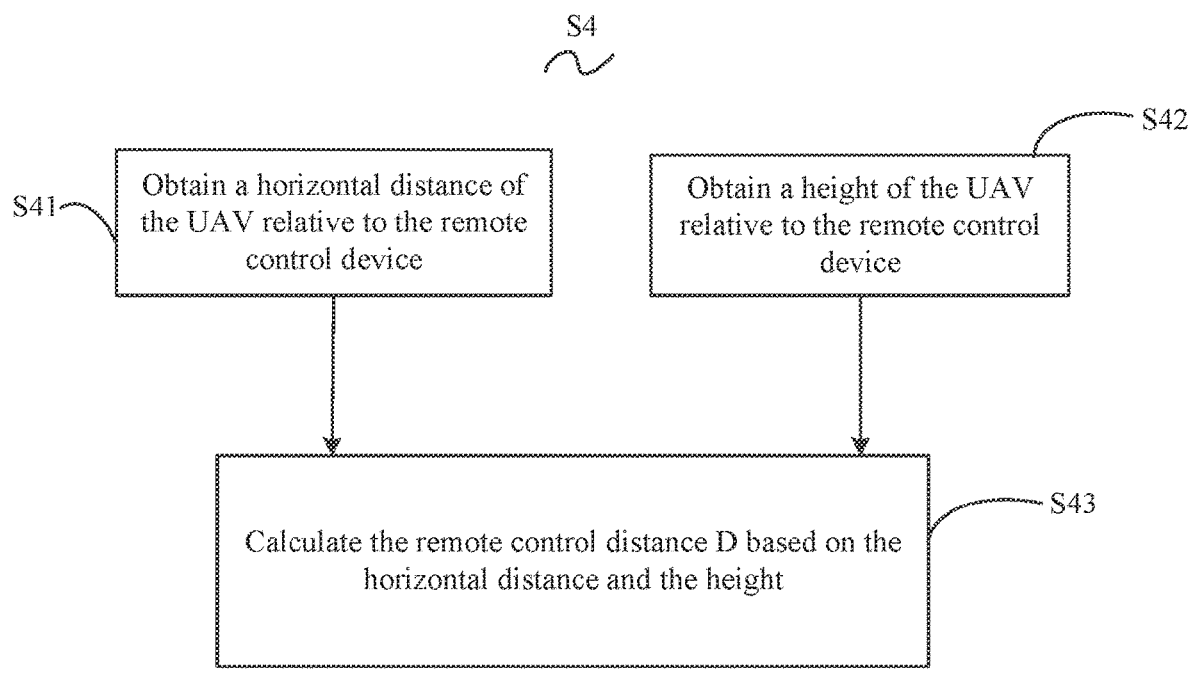
FIG. 5 is a flow chart illustrating a control method, according to another example embodiment.

Referring to FIG. 5, in some embodiments, step S4, i.e., the step of detecting the remote control distance D between the UAV 100 and the remote control device 200 may include:

S41: obtaining a horizontal distance of the UAV 100 relative to the remote control device 200;

S42: obtaining a height of the UAV 100 relative to the remote control device 200; and S43: calculating the remote control distance D based on the horizontal distance and the height.

In some embodiments, the sequence for executing the steps S41 and S42 is not limited. For example, steps S41 and S42 may be executed simultaneously. Alternatively, step S41 may be executed before or after step S42, and step S43 may be executed after execution of steps S41 and S42 are completed.

Figure 6:
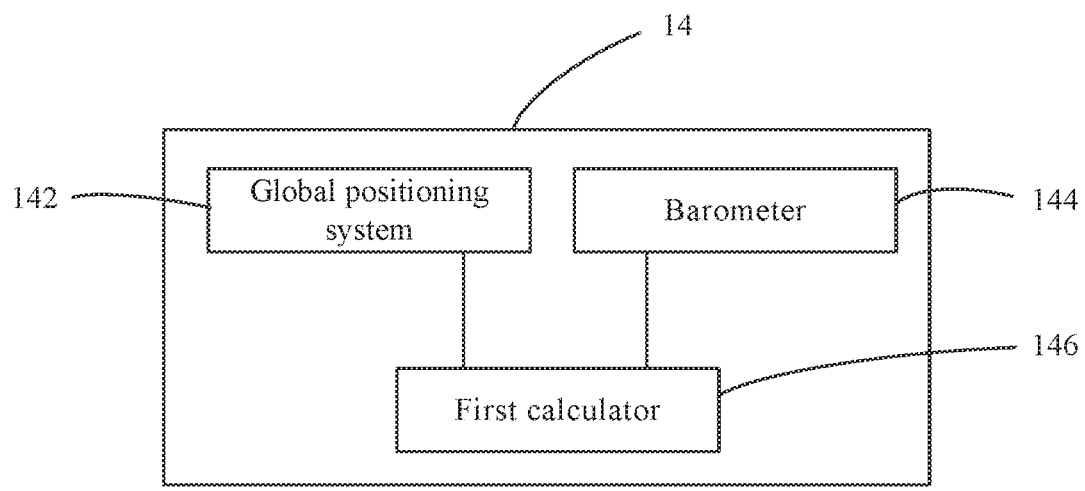
FIG. 6 is a schematic diagram of functional modules of the UAV, according to an example embodiment.

Referring to FIG. 6, the control method may be executed by UAV 100. In some embodiments, the first distance detector 14 of the UAV 100 may include a global positioning system 142, a barometer 144, and a first calculator 146. The global positioning system 142, the barometer 144, and the first calculator 146 may be configured to execute steps S41, S42, and S43, respectively. In other words, the global positioning system 142 may be configured to obtain a horizontal distance of the UAV 100 relative to the remote control device 200. The barometer 144 may be configured to obtain a height of the UAV 100 relative to the remote control device 200. The first calculator 146 may be configured to calculate the remote control distance D based on the horizontal distance and the height. The global positioning system 142 and the barometer 144 may both be electrically connected with the first calculator 146. The data obtained by the global positioning system 142 and the barometer 144 may both be transmitted to the first calculator 146 for processing. In some embodiments, the global positioning system 142 may include, but not be limited to, any one of the Global Positioning System ("GPS") of the United States, the Global Navigation Satellite System ("GLONASS") of Russia, the Beidou system of China, and the Galileo system of Europe.

Figure 7:
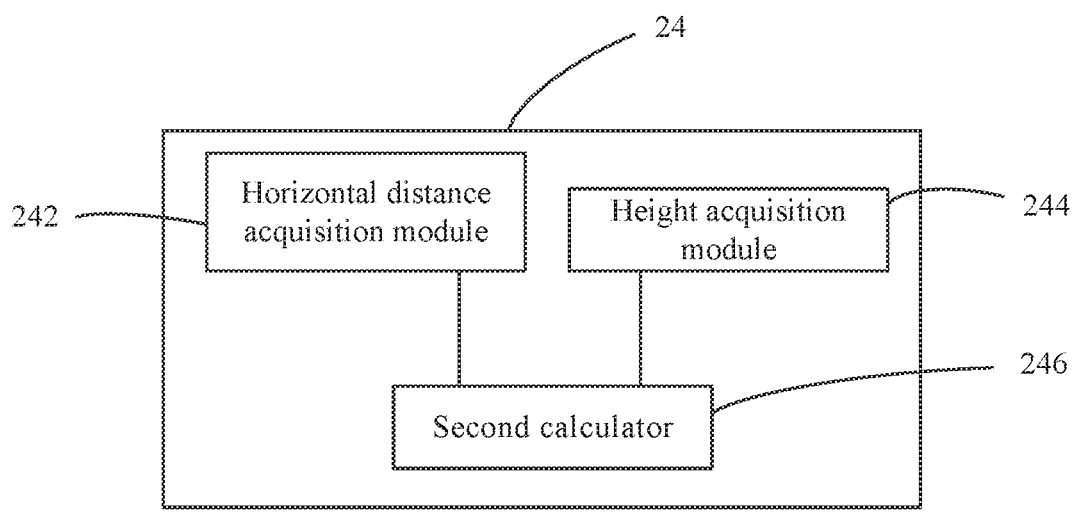
FIG. 7 is a schematic diagram of functional modules of the remote control device, according to an example embodiment.

Referring to FIG. 7, the control method may be executed by the remote control device 200. In some embodiments, the second distance detector 24 of the remote control device 200 may include a horizontal distance acquisition module 242, a height acquisition module 244, and a second calculator 246. The horizontal distance acquisition module 242, the height acquisition module 244, and the second calculator 246 may be configured to execute the steps S41, S42, and S43, respectively. In other words, the horizontal distance acquisition module 242 may be configured to obtain the horizontal distance of the UAV 100 relative to the remote control device 200. The height acquisition module 244 may be configured to obtain the height of the UAV 100 relative to the remote control device 200. The second calculator 246 may be configured to calculate the remote control distance D based on the horizontal distance and the height. The horizontal distance acquisition module 242 and the height acquisition module 244 may both be electrically connected with the second calculator 246. Data obtained by the horizontal distance acquisition module 242 and the height acquisition module 244 may both be transmitted to the second calculator 246 for processing. The horizontal distance acquisition module 242 may include, but not be limited to, any one of the GPS, GLONASS, the Beidou system of China, and the Galileo system of Europe. The height acquisition module 244 may include, but not be limited to, the barometer.

As such, the remote control distance D between the UAV 100 and the remote control device 200 may be calculated based on the horizontal distance of the UAV 100 relative to the remote control device 200 and the height of the UAV 100 relative to the remote control device 200.

Figure 8:
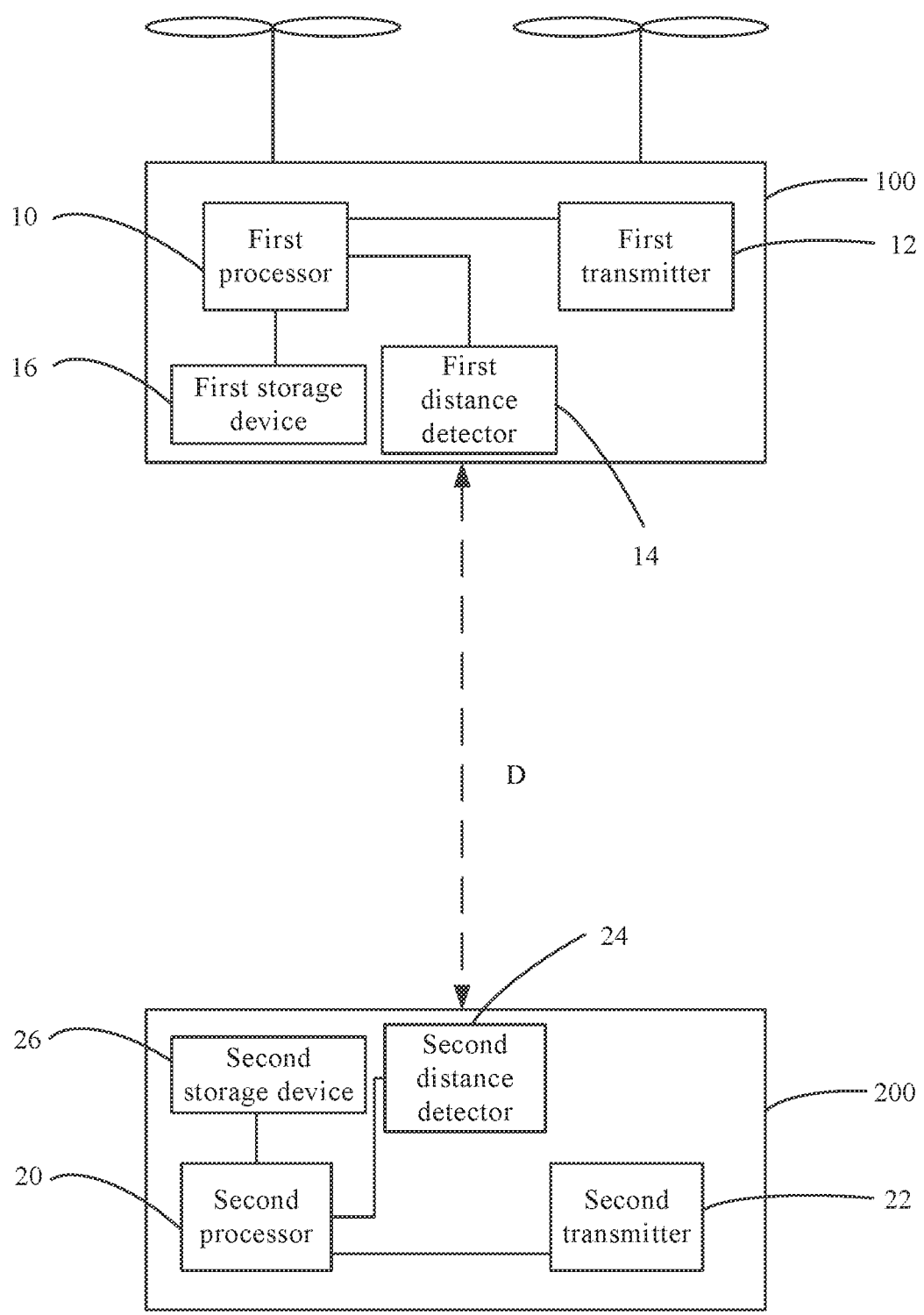
FIG. 8 is a schematic diagram of functional modules of the UAV and the remote control device, according to another example embodiment.

Referring to FIG. 8, in some embodiments, the UAV 100 and the remote control device 200 may each include a first storage device 16 and a second storage device 26. The first storage device 16 and the second storage device 26 may both be configured to store a pre-configured truth table (as shown in Table 1). The truth table may include a distance range and preset transmission power corresponding to the distance range. The step of increasing or maintaining the signal transmission power of the UAV and/or the remote control device (step S2) may include controlling the UAV 100 and/or the remote control device 200 to execute the preset transmission power based on the remote control distance D and the distance range; and/or The step of decreasing or maintaining the signal transmission power of the UAV 100 and/or the remote control device 200 (step S3) may include controlling the UAV 100 and/or the remote control device 200 to execute the preset transmission power based on the remote control distance and the distance range.

Next descriptions explain the step of controlling the UAV 100 and/or the remote control device 200 to execute the preset transmission power based on the remote control distance D and the distance range: when the remote control distance D varies within a distance range in the truth table, the transmission power of the UAV 100 and the remote control device 200 may remain unchanged. For example, although the remote control distance D changes, if it remains in a range of (1, 2] km, then the transmission power of the UAV 100 may remain at 19 dBm (decibel-milliwatts), and the transmission power of the remote control device 200 remains at 19 dBm. When the remote control distance D increases from a distance range to another distance range in the truth table, e.g., when the remote control distance D increases from the range of (1, 2] to the range of (2, 3], the transmission power of the UAV 100 and the remote control device 200 may be increased. For example, the transmission power of the UAV 100 may be increased from 19 dBm to 22 dBm. The transmission power of the remote control device 200 may be increased from 19 dBm to 22 dBm. When the remote control distance D decreases from a distance range to another distance range in the truth table, e.g., when the remote control distance D decreases from the range of (1, 2] to the range of (0, 1], the transmission power of the UAV 100 and the remote control device 200 may be decreased. For example, the transmission power of the UAV 100 may be decreased from 19 dBm to 16 dBm, and the transmission power of the remote control device 200 may be decreased from 19 dBm to 16 dBm. In addition, the distance range and the preset transmission power in the truth table 1 may be obtained through practical external field test. In some embodiments, the truth table may be obtained through testing multiple different external field environments. For example, the external field environment may include: city environment, sea environment, mountain environment, plateau environment, etc. As such, the transmission power of the UAV 100 and the remote control device 200 in the truth table is relatively accurate.

TABLE 1

| Distance range D (km) | Remote control device preset transmission power (dBm) | UAV preset transmission power (dBm) |
|---|---|---|
| ≤1 | 16 | 16 |
| 1 < D ≤ 2 | 19 | 19 |
| 2 < D ≤ 3 | 22 | 22 |
| 3 < D ≤ 4 | 25 | 25 |
| 4 < D | 28 | 28 |

In some embodiments, the first storage device 16 and the first processor 10 of the UAV 100 may be electrically connected. The first processor 10 may obtain the remote control distance D between the UAV 100 and the remote control device 200, and may control the first transmitter 12 based on the truth table stored in the first storage device 16 to maintain or change the transmission power. The second storage device 26 and the second processor 20 of the remote control device 200 may be electrically connected. The second processor 20 may obtain the distance between the UAV 100 and the remote control device 200 and may control the second transmitter 22 based on the truth table stored in the second storage device 26 to maintain or change the transmission power. As such, the transmission power of the UAV 100 and the remote control device 200 may be reduced while maintaining the normal signal transmission between the UAV 100 and the remote control device 200. On the one hand, energy may be saved for the UAV 100 and the remote control device 200, avoiding waste. On the other hand, maintaining the maximum power to transmit signals at all time may be avoided, thereby reducing the electromagnetic radiation effects of the transmission power on human bodies located adjacent to the remote control device 200, as well as reducing the interference with the surrounding electromagnetic environment.

Figure 9:
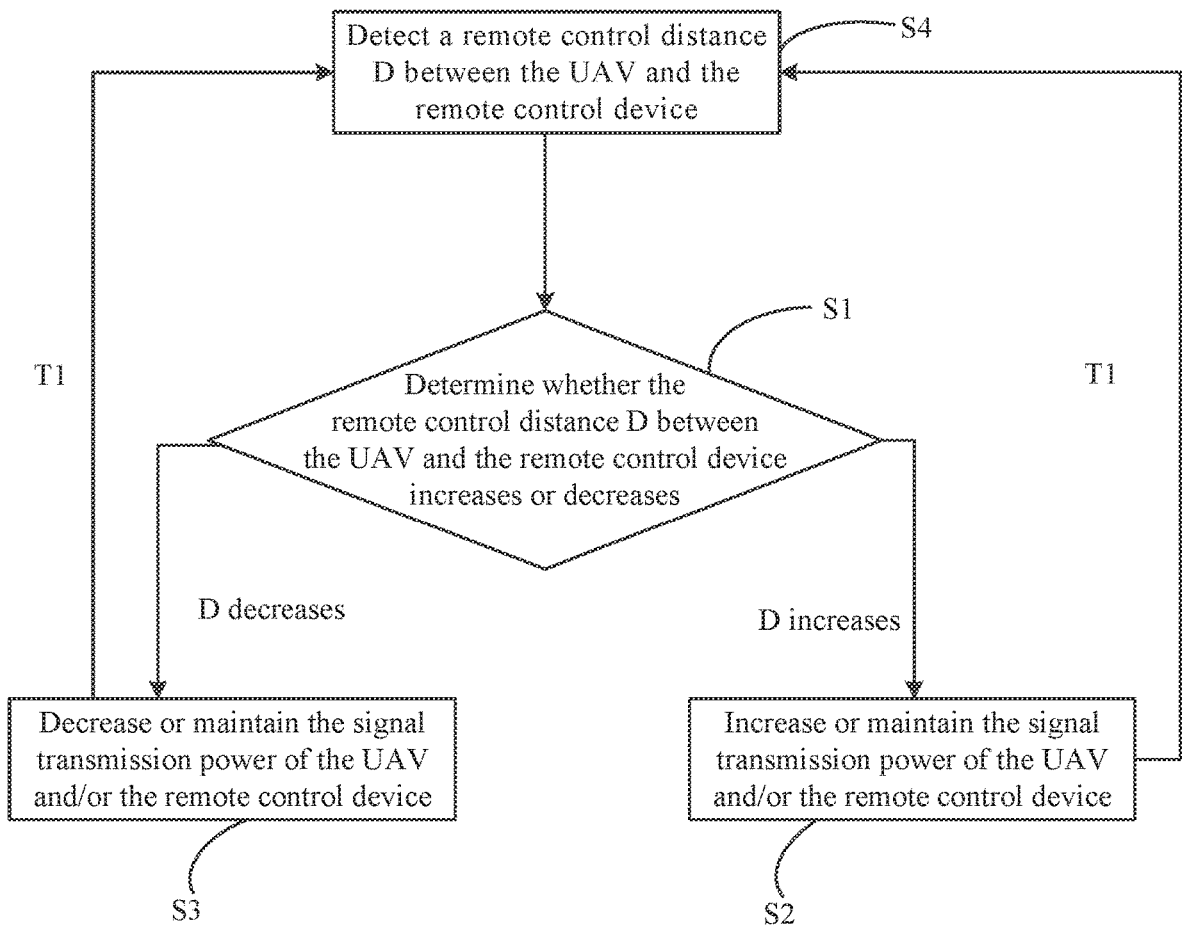
FIG. 9 is a flow chart illustrating a control method, according to another example embodiment.

Referring to FIG. 9, in some embodiments, three steps S4, S1, and S2 or S3 may be executed once every first predetermined time interval T1. In other words, three steps of detecting the distance between the UAV 100 and the remote control device 200, determining whether the remote control distance D between the UAV 100 and the remote control device 200 increases or decreases, increasing or maintaining the signal transmission power of the UAV 100 and/or the remote control device 200, or decreasing or maintaining the signal transmission power of the UAV 100 and/or the remote control device 200 may be executed once every first predetermined time interval T1.

Referring to FIG. 6 and FIG. 8, the control method may be executed by the UAV 100. In some embodiments, step S4 executed by the first distance detector 14 of the UAV 100 (in some embodiments, step S4 may include steps S41, S42, and S43), step S1 executed by the first processor 10, and step S2 or S3 executed by the first transmitter 12 may be executed once every first predetermined time interval T1.

Referring to FIG. 7 and FIG. 8, the control method may be executed by the remote control device 200. In some embodiments, step S4 executed by the second distance detector 24 of the remote control device 200 (in some embodiments, step S4 may include steps S41, S42, and S43), step S1 executed by the second processor 20, and step S2 or S3 executed by the second transmitter 22 may be executed once every first predetermined time interval T1.

As such, at every first predetermined time interval T1, the UAV 100 and the remote control device 200 may each detect the remote control distance D between the UAV 100 and the remote control device 200. Accordingly, the transmission power of the UAV 100 and the remote control device 200 may be changed in real time based on the remote control distance D and the truth table and maintain the quality of the signal transmission between the UAV 100 and the remote control device 200.

In some embodiments, the first predetermined time interval T1 implemented in the control method, the UAV 100, and the remote control device 200 may be any suitable value obtained from the range of (0.001-1) second. For example, the first predetermined time interval T1 may be 0.001 second, 0.005 second, 0.01 second, 0.05 second, 0.1 second, 0.15 second, 0.2 second, 0.25 second, 0.3 second, 0.35 second, 0.4 second, 0.45 second, 0.5 second, 0.55 second, 0.6 second, 0.65 second, 0.7 second, 0.75 second, 0.8 second, 0.85 second, 0.9 second, 0.95 second, or 1 second. In some embodiments, value of the first predetermined time interval T1 may be set based on a flight velocity of the UAV 100.

Figure 10:
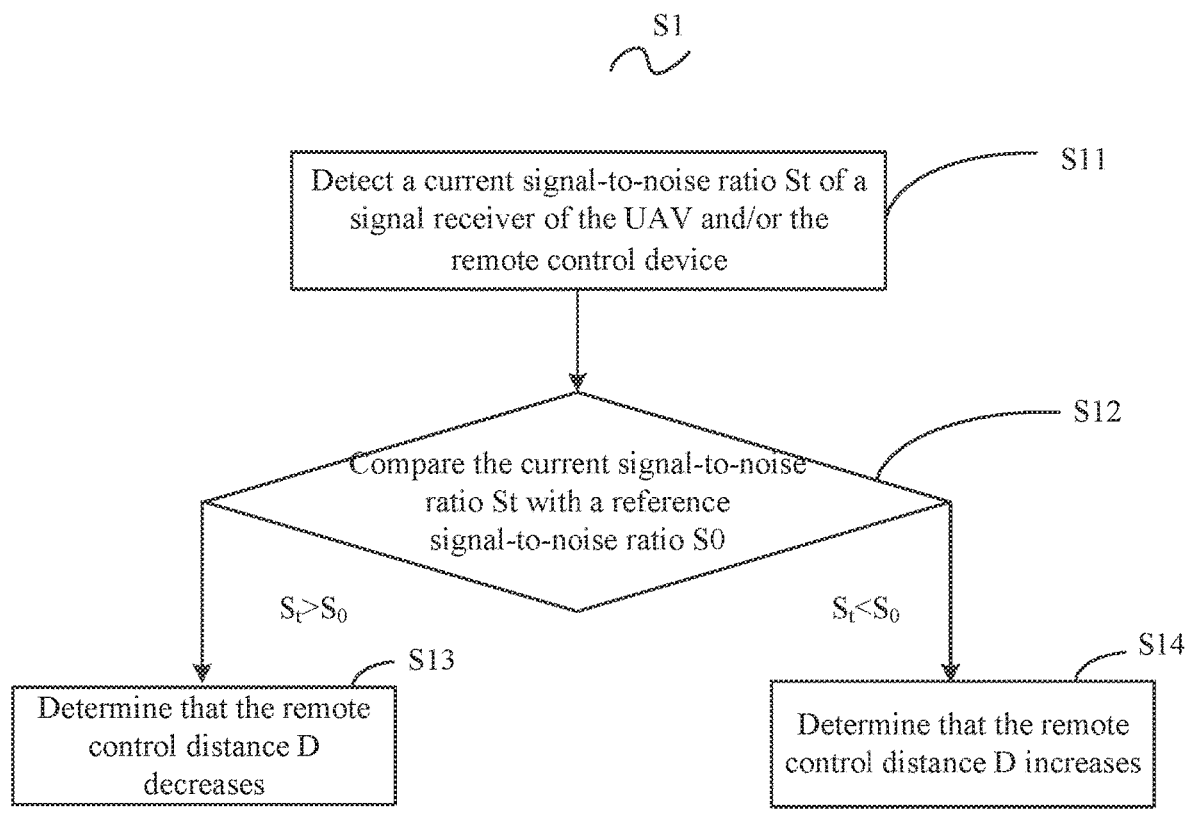
FIG. 10 is a flow chart illustrating a control method, according to another example embodiment.

Referring to FIG. 10, in some embodiments, step S1, i.e., determining whether the remote control distance D between the UAV 100 and the remote control device 200 increases or decreases may include the following steps:

S11: detecting a current signal-to-noise ratio St of a signal receiver of the UAV 100 and/or the remote control device 200;

S12: comparing the current signal-to-noise ratio St with a reference signal-to-noise ratio S0;

S13: if the current signal-to-noise ratio St is smaller than the reference signal-to-noise ratio S0, determining that the remote control distance D increases;

S14: if the current signal-to-noise ratio St is greater than the reference signal-to-noise ratio S0, determining that the remote control distance D decreases.

In some embodiments, steps S11, S12, and S13 or S14 are executed in the listed order. In some embodiments, the reference signal-to-noise ratio S0 may be determined through external field testing the UAV 100. When the current signal-to-noise ratio S0 equals to the reference signal-to-noise ratio S0, images and control signals may be transmitted with a high quality without any interruptions or risk of data loss. In some embodiments, the reference signal-to-noise ratio S0 may be obtained from a range of (−4 to −2) dB. For example, the reference signal-to-noise ratio S0 may have a value of −4 dB, −3.9 dB, −3.8 dB, −3.75 dB, −3.6 dB, −3.5 dB, −3.4 dB, −3.3 dB, −3.25 dB, −3.2 dB, −3.1 dB, −3 dB, −2.9 dB, −2.8 dB, −2.75 dB, −2.7 dB, −2.6 dB, −2.5 dB, −2.4 dB, −2.3 dB, −2.25 dB, −2.2 dB, −2.1 dB, −2 dB. The value of the reference signal-to-noise ratio S0 may be selected based on the flight velocity of the UAV 100. In some embodiments, if the current signal-to-noise ratio St of the UAV 100 and the remote control device 200 equals to the reference signal-to-noise ratio S0, then normal signal transmission between the UAV 100 and the remote control device 200 may be maintained. If the current signal-to-noise ratio St is smaller than the reference signal-to-noise ratio S0, under the condition that the transmission power of the UAV 100 and the remote control device 200 remains unchanged, it may indicate that the quality of signal transmission between the UAV 100 and the remote control device 200 decreases and that the remote control distance D increases. If the current signal-to-noise ratio St is greater than the reference signal-to-noise ratio S0, under the condition that that the transmission power of the UAV 100 and the remote control device 200 remains unchanged, it may indicate that the quality of signal transmission between the UAV 100 and the remote control device 200 increases and that the remote control distance D decreases.

Figure 11:
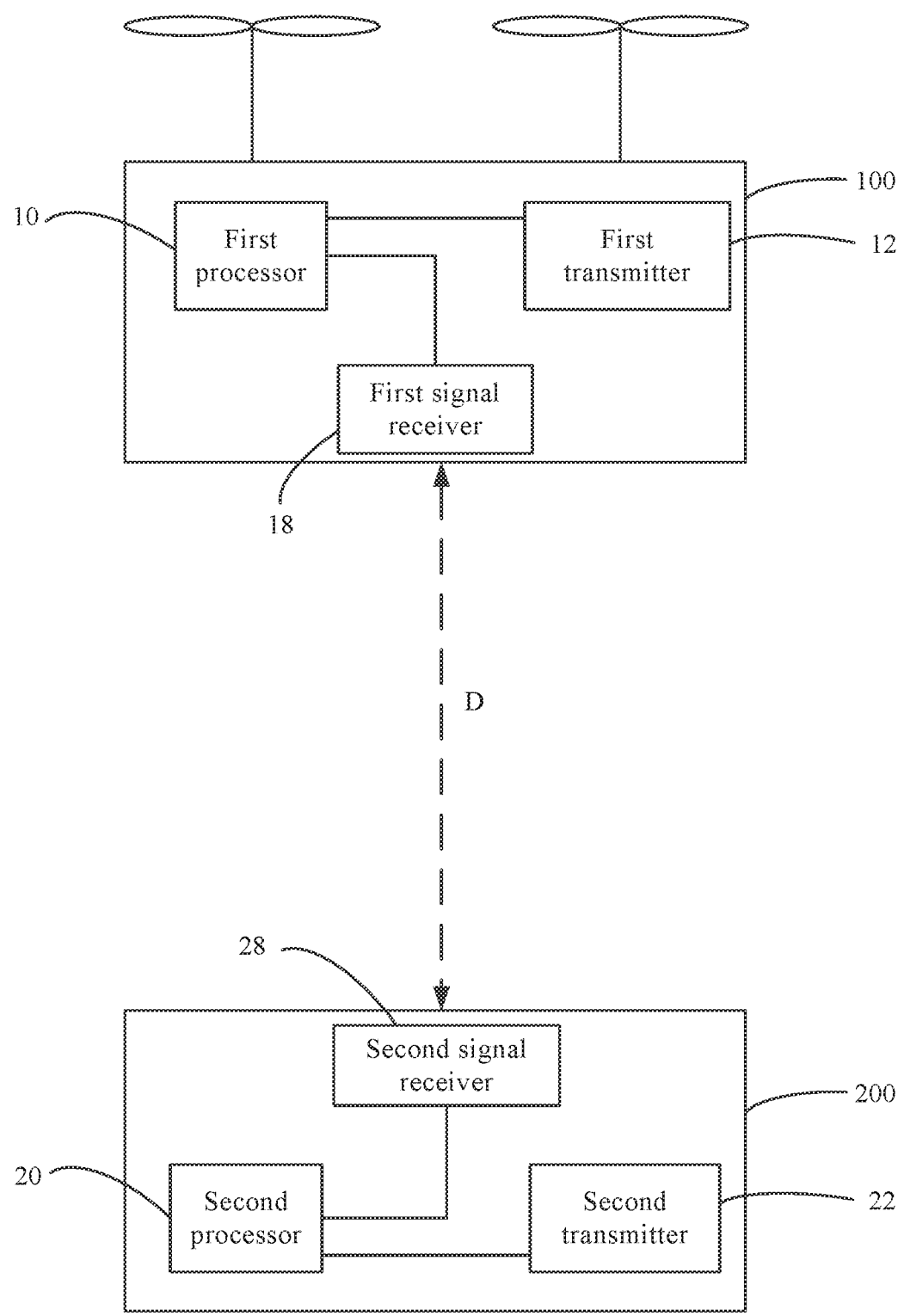
FIG. 11 is a schematic diagram of functional modules of the UAV and the remote control device, according to another example embodiment.

Referring to FIG. 11, the control method may be executed by the UAV 100. In some embodiments, the UAV 100 may include a first signal receiver 18 electrically connected with the first processor 10. The first processor 10 may be configured to execute steps S11, S12, S13, and S14. In other words, the first processor 10 may be configured to detect a current signal-to-noise ratio St of the first signal receiver 18 of the UAV 100, and compare the current signal-to-noise ratio St with a reference signal-to-noise ratio S0. The first processor 10 may be configured to determine that the remote control distance D increases if the current signal-to-noise ratio St is smaller than the reference signal-to-noise ratio S0, and determine that the remote control distance D decreases if the current signal-to-noise ratio St is greater than the reference signal-to-noise ratio S0.

In some embodiments, the control method may be executed by the remote control device 200. In some embodiments, the remote control device 200 may include a second signal receiver 28 electrically connected with the second processor 20. The second processor 20 may be configured to execute steps S11, S12, S13, and S14. In other words, the second processor 20 may be configured to detect a current signal-to-noise ratio St of the second signal receiver 28 of the remote control device 200, and compare the current signal-to-noise ratio St with a reference signal-to-noise ratio S0. The second processor 20 may be configured to determine that the remote control distance D increases if the current signal-to-noise ratio St is smaller than the reference signal-to-noise ratio S0, and determine that the remote control distance D decreases if the current signal-to-noise ratio St is greater than the reference signal-to-noise ratio S0.

Figure 12:
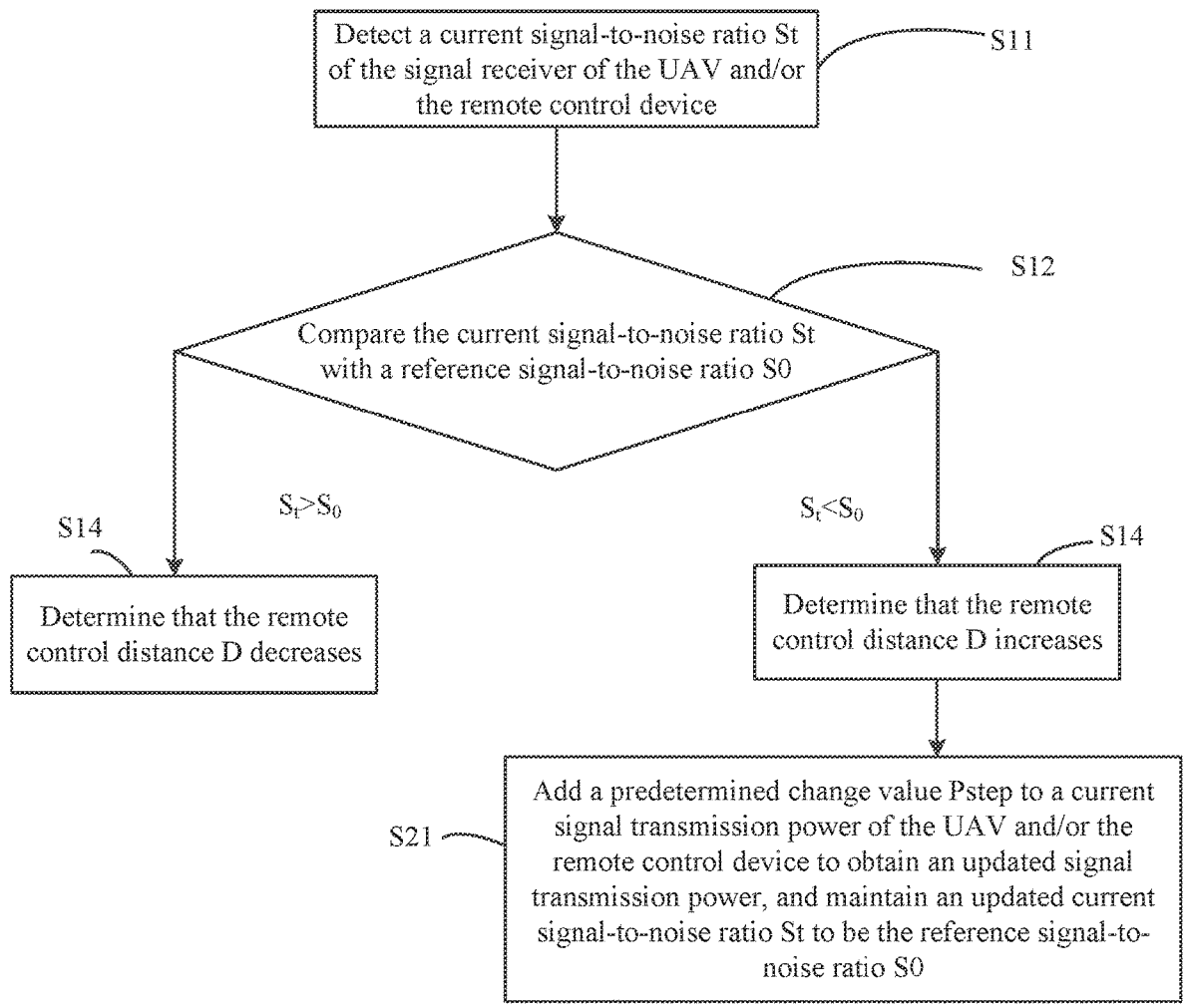
FIG. 12 is a flow chart illustrating a control method, according to another example embodiment.
Figure 14:
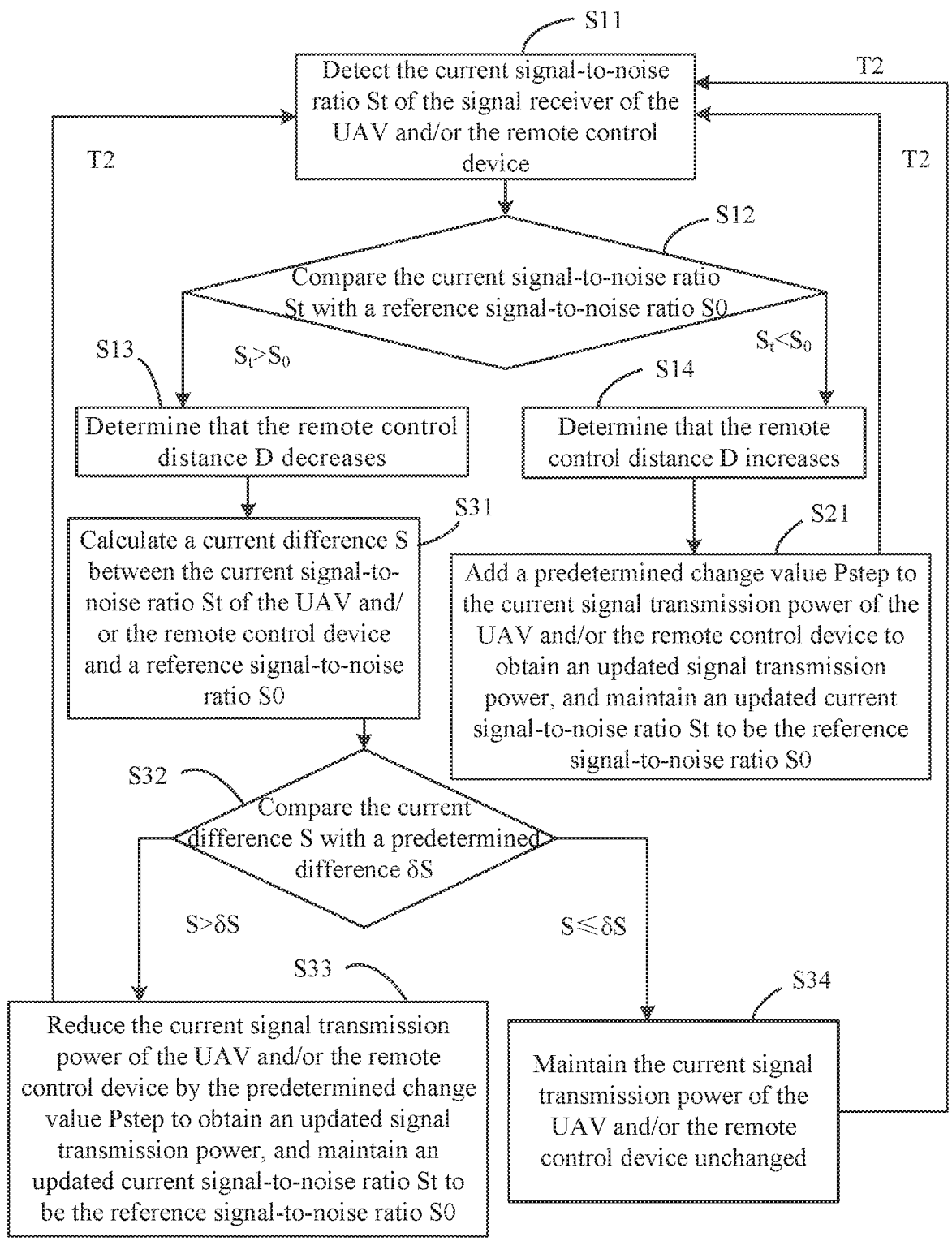
FIG. 14 is a flow chart illustrating a control method, according to another example embodiment.

Referring to FIG. 12 and FIG. 14, in some embodiments, step S2, i.e., the step of increasing or maintaining the signal transmission power of the UAV 100 and/or the remote control device 200 when the remote control distance D increases (in some embodiments, it means the current signal-to-noise ratio St is smaller than the reference signal-to-noise ratio S0) may include:

S21: adding a predetermined change value Pstep to a current signal transmission power of the UAV 100 and/or the remote control device 200 to obtain an updated signal transmission power, and maintaining an updated current signal-to-noise ratio St to be the reference signal-to-noise ratio S0. When the current signal-to-noise ratio St is the reference signal-to-noise ratio S0, images and control signals may be transmitted at a high quality. As such, when the current signal-to-noise ratio St of the UAV 100 and the remote control device 200 equals to the reference signal-to-noise ratio S0, signals can be transmitted normally at the remote control distance D between the UAV 100 and the remote control device 200.

Referring to FIG. 11, the control method may be executed by the UAV 100. In some embodiments, the first transmitter 12 of the UAV 100 may execute step S21. In other words, the predetermined change value Pstep may be added to the current signal transmission power of the UAV 100 to obtain an updated signal transmission power, and the updated current signal-to-noise ratio St may be maintained to be the reference signal-to-noise ratio S0.

In some embodiments, the control method may be executed by the remote control device 200. In some embodiments, the second transmitter 22 of the remote control device 200 may be configured to execute step S21. In other words, the predetermined change value Pstep may be added to the current signal transmission power of the remote control device 200 to obtain an updated signal transmission power, and the updated current signal-to-noise ratio St may be maintained to be the reference signal-to-noise ratio S0.

Figure 13:
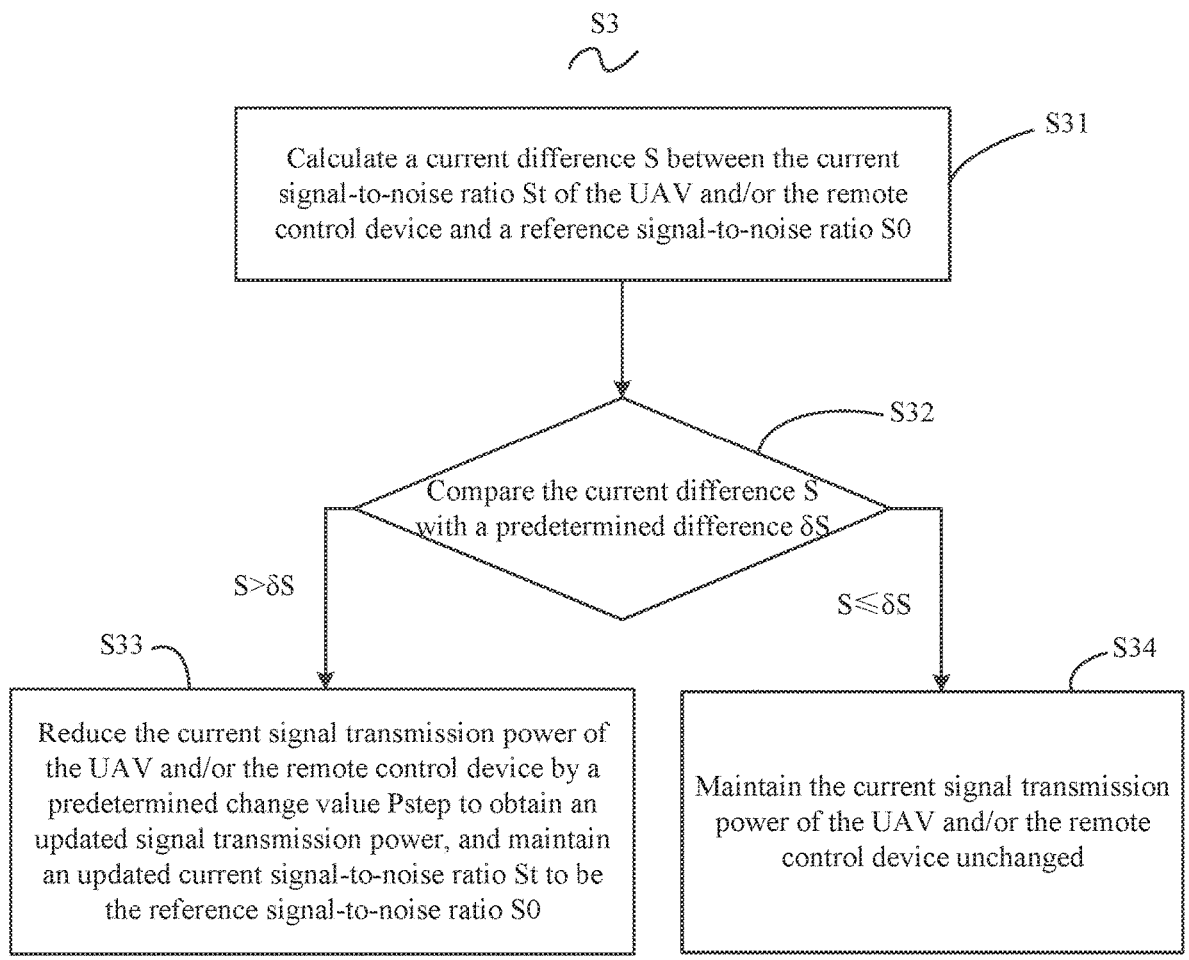
FIG. 13 is a flow chart illustrating a control method, according to another example embodiment.

Referring to FIG. 13, in some embodiments, step S3, i.e., the step of decreasing or maintaining the signal transmission power of the UAV 100 and/or the remote control device 200 when the remote control distance D decreases (in some embodiments, it indicates that the current signal-to-noise ratio St is greater than the reference signal-to-noise ratio S0) may include:

S31: calculating a current difference S between the current signal-to-noise ratio St of the UAV 100 and/or the remote control device 200 and a reference signal-to-noise ratio S0;

S32: compare the current difference S with a predetermined difference δS;

S33: if the current difference S is smaller than or equal to the predetermined difference δS, maintaining the current signal transmission power of the UAV 100 and/or the remote control device 200 unchanged;

S34: if the current difference S is greater than the predetermined difference δS, reducing the current signal transmission power of the UAV 100 and/or the remote control device 200 by a predetermined change value Pstep to obtain an updated signal transmission power, and maintaining an updated current signal-to-noise ratio St to be the reference signal-to-noise ratio S0.

In some embodiments, the predetermined difference δS is greater than 0 (δS>0). If the current difference S is smaller than the predetermined difference δS, i.e., if the current signal-to-noise ratio St is greater than the reference signal-to-noise ratio S0 and smaller than or equal to a sum of the reference signal-to-noise S0 and the predetermined difference δS (i.e., S0<St≤(S0+δS)), then the current signal transmission power of the UAV 100 and/or the remote control device 200 may be maintained unchanged. If the current difference S is greater than the predetermined difference δS, i.e., if the current signal-to-noise ratio St is greater than the sum of the reference signal-to-noise ratio S0 and the predetermined difference δS (i.e., St>(S0+δS)), the current signal transmission power of the UAV 100 and/or the remote control device 200 may be reduced by the predetermined change value Pstep to obtain an updated signal transmission power. As such, by setting the predetermined difference δS, instability of the transmission power caused by reducing the current signal transmission power of the UAV 100 and/or the remote control device 200 by the predetermined change value Pstep may be avoided.

Referring to FIG. 11, the control method may be executed by the UAV 100. In some embodiments, the first transmitter 12 of the UAV 100 may be configured to execute steps S31, S32, S33, and S34. In other words, the first transmitter 12 may be configured to:

calculate a current difference S between the current signal-to-noise ratio St of the UAV 100 and the reference signal-to-noise ratio S0;

compare the current difference S with a predetermined difference δS;

if the current difference S is smaller than or equal to the predetermined difference δS, control the UAV 100 to maintain the current signal transmission power of the UAV 100 unchanged;

if the current difference S is greater than the predetermined difference δS, control the UAV 100 to reduce the current signal transmission power of the UAV 100 by a predetermined change value Pstep to obtain an updated signal transmission power, and to maintain an updated current signal-to-noise ratio St to be the reference signal-to-noise ratio S0.

Referring to FIG. 11, the control method may be executed by the remote control device 200. In some embodiments, the second transmitter 22 of the remote control device 200 may execute steps S31, S32, S33, and S34. In other words, the second transmitter 22 may be configured to:

calculate a current difference S between a current signal-to-noise ratio St of the remote control device 200 and a reference signal-to-noise ratio S0;

compare the current difference S with a predetermined difference δS;

if the current difference S is smaller than or equal to the predetermined difference δS, control the remote control device 200 to maintain a current signal transmission power of the remote control device 200 unchanged;

if the current difference S is greater than the predetermined difference δS, control the remote control device 200 to reduce a current signal transmission power of the remote control device 200 by a predetermined change value Pstep to obtain an updated signal transmission power, and to maintain an updated current signal-to-noise ratio St to be the reference signal-to-noise ratio S0.

In some embodiments, after step S1 (in some embodiments, step S1 may include steps S11, S12, and S13) is executed, steps S21 or S31, step S32 and step S33 or S34 may be executed.

As such, when the signal-to-noise ratio St received by the UAV 100 and the remote control device 200 is greater than the reference signal-to-noise ratio S0, i.e., when the remote control distance D between the UAV 100 and the remote control device 200 decreases, the signal transmission power of the UAV 100 and the remote control device 200 may be reduced, or the UAV 100 and the remote control device 200 may be controlled to maintain the signal transmission power. While the normal signal transmission between the UAV 100 and the remote control device 200 is maintained, on the one hand, energy may be saved for the UAV 100 and the remote control device 200, avoiding waste. On the other hand, maintaining the maximum power to transmit signals at all the time may be avoided, thereby reducing electromagnetic radiation effects of the transmission power on human bodies located adjacent to the remote control device 200, as well as reducing interference with the surrounding electromagnetic environment.

In some embodiments, the reference signal-to-noise ratio S0 implemented in the control method, the UAV 100 and the remote control device 200 may be obtained through external field test. In some embodiments, the reference signal-to-noise ratio S0 may be obtained through external field testing of multiple different environments. In some embodiments, the reference signal-to-noise ratio S0 may be obtained through testing multiple different external field environments. For example, the external field environments may include: a city environment, a sea environment, a mountain environment, a plateau environment, etc. As such, the reference signal-to-noise ratio S0 may accurately reflect a relationship between the remote control distance D between the UAV 100 and the remote control device 200 and the signal transmission power.

In some embodiments, the predetermined difference δS implemented in the control method, the UAV 100 and the remote control device 200 may be any suitable value obtained in the range of (2~3) dB. For example, the value of the predetermined difference δS may include: 2 dB, 2.1 dB, 2.2 dB, 2.25 dB, 2.3 dB, 2.4 dB, 2.5 dB, 2.6 dB, 2.7 dB, 2.75 dB, 2.8 dB, 2.9 dB, or 3 dB. The value of the predetermined difference δS may be selected based on the flight velocity of the UAV 100. As such, when the value of the predetermined difference δS is obtained from the range of (2~3) dB, instability phenomenon of the signal transmission power caused by reducing the current signal transmission power of the UAV 100 and/or the remote control device 200 by a predetermined change value may be avoided.

In some embodiments, the predetermined change value Pstep implemented in the control method, the UAV 100 and the remote control device 200 may be any value obtained in the range of (0.5~1) dB. For example, the predetermined change value Pstep may include: 0.5 dB, 0.55 dB, 0.6 dB, 0.65 dB, 0.7 dB, 0.75 dB, 0.8 dB, 0.85 dB, 0.9 dB, 0.95 dB, or 1 dB. The value of the predetermined change value Pstep may be selected based on the flight velocity of the UAV 100.

Referring to FIG. 14, in some embodiments, the step of detecting a current signal-to-noise ratio St of a signal receiver of the UAV 100 and/or the remote control device 200 (including step S11) to the step of obtaining an updated signal transmission power (step S21 or S33) or to the step of maintaining the current signal transmission power of the UAV 100 and/or the remote control device 200 unchanged (step S34) may be executed once at every second predetermined time interval T2.

Referring to FIG. 11, the control method may be executed by the UAV 100. In some embodiments, the step of detecting the current signal-to-noise ratio St of the first signal receiver 18 of the UAV 100 (including step S11) executed by the first processor 10 of the UAV 100, to the step of obtaining an updated signal transmission power (including step S21 or S33) executed by the first transmitter 12, or to the step of maintaining the current signal transmission power of the UAV 100 and/or the remote control device 200 unchanged (step S34) may be executed once at every second predetermined time interval T2.

In some embodiments, the control method may be executed by the remote control device 200. In some embodiments, the step of detecting the current signal-to-noise ratio St of the second signal receiver 28 of the remote control device 200 (including step S11) executed by the second processor 20 of the remote control device 200 to the step of obtaining an updated signal transmission power (including step S21 or S33) executed by the second transmitter 22, or to the step of maintaining the current signal transmission power of the UAV 100 and/or the remote control device 200 unchanged (step S34) may be executed once at every second predetermined time interval T2.

As such, at every second predetermined time interval T2, the UAV 100 and the remote control device 200 may obtain the most recent current signal-to-noise ratio, such that the UAV 100 and the remote control device 200 may obtain an updated signal transmission power based on the current signal-to-noise ratio St, the reference signal-to-noise ratio S0, the predetermined difference 6S, and the predetermined change value Pstep, thereby realizing changing the signal transmission power of the remote control device 200 and the UAV 100 in real time.

In some embodiments, the second predetermined time interval T2 implemented in the control method, the UAV 100, and the remote control device 200 may be any suitable value selected from the range of (0.001-1) second. For example, the second predetermined time interval T2 may include: 0.001 second, 0.005 second, 0.01 second, 0.05 second, 0.1 second, 0.15 second, 0.2 second, 0.25 second, 0.3 second, 0.35 second, 0.4 second, 0.45 second, 0.5 second, 0.55 second, 0.6 second, 0.65 second, 0.7 second, 0.75 second, 0.8 second, 0.85 second, 0.9 second, 0.95 second, or 1 second. The value of the second predetermined time interval T2 may be selected based on the flight velocity of the UAV 100.

A person having ordinary skill in the art can appreciate that when the description mentions "an embodiment," "some embodiments," "an illustrative embodiment," "an example," "a specific example," or "some examples," it means that specific characteristics, structures, materials, or features described with reference to the embodiment or example are included in at least one embodiment or example of the present disclosure. In this specification, illustrative expression of the above terms does not necessarily mean the same embodiment or example. Further, the described specific characteristics, structures, materials, or features may be combined in a suitable manner in one or more embodiments or examples.

Processes or methods described in the flow charts or described in other manners may be understood as including one or more code modules, segments, or portions of executable instructions configured to execute specific logic functions or steps of a process. The scope of the preferred embodiments of the present disclosure may include other executions. Executions may not need follow the illustrated or described sequence or order. The functions may be executed in a substantially simultaneous manner or in a reversed order. These should be understood by a person having ordinary skills in the technical field of the embodiments of the present disclosure.

Logics and/or steps of illustrated in the flow chart or described in other manners may be regarded as a fixed-order sequence list of executable instructions configured to execute the logic functions. The logics and/or steps may be executed in any suitable non-transitory computer-readable medium, and may be used by instruction-execution systems, apparatuses, or devices (e.g., computer-based systems, systems having processors, or other systems that can retrieve instructions from the instruction-execution systems, apparatuses, or devices and execute the instructions), or may be used in combination with the instruction-execution systems, apparatuses, or devices. In the present specification, a "computer-readable medium" may include any device that can include, store, communicate, broadcast, or transfer programs to be used by instruction-execution systems, apparatuses, or devices. Examples of the computer-readable medium may include, but not be limited to, the following: an electrical connector (e.g., an electrical device) having one or multiple wirings, a portable computer disk (e.g., a magnetic device), a random access memory ("RAM"), a read only memory ("ROM"), a erasable programmable read only memory ("EPROM") or a flash memory, an optical device, or a portable compact disc read only memory ("CDROM"). In some embodiments, the computer-readable medium may be paper on which the programs may be printed or other suitable medium, because the paper or other medium may be optically scanned. The scanned copy may be edited, interpreted, or if necessary processed using other suitable method to obtain the programs in an electrical manner. The programs can then be stored in a computer storage device.

A person having ordinary skills in the art can appreciate that various parts of the present disclosure may be implemented using related hardware, computer software, firmware, or a combination thereof. In the above embodiments, multiple steps or methods may be executed by software or firmware stored in the computer-readable storage medium and executable by a suitable instruction-executing system. For example, if the present disclosure is executed by hardware, the hardware may include any of the following technologies known in the art or any combination thereof: a discrete logic circuit of a logic gate circuit configured to perform logic functions for digital signals, an application specific integrated circuit having suitable combinations of logic gate circuits, a programmable gate array ("PGA"), a field programmable gate array ("FPGA"), etc.

A person having ordinary skills in the art can understand that some or all of the steps of the above embodiments of the disclosed method may be implemented by a program instructing relevant hardware. The program may be stored in a computer-readable medium. When executed, the program may include one of the steps or a combination of the steps of the disclosed method.

Various functional units may be integrated in a single processing module, or may exist as separate physical units. In some embodiments, two or more units may be integrated in a single module. The integrated module may be executed by hardware or by software functional modules. If the integrated module is executed by software functional modules and sold or used as an independent product, the integrated module may also be stored in a computer-readable storage medium.

The storage medium mentioned above may be a read only storage device (e.g., memory), a magnetic disk, or an optical disk, etc. Although the above has shown and described the embodiments of the present disclosure, it should be understood that the above embodiments are illustrative, and cannot be understood as limiting the present disclosure. A person having ordinary skills in the art can modify, edit, replace, and vary the embodiments within the scope of the present disclosure.

What is claimed is:

1. A method for controlling a signal transmission power of at least one of an unmanned aerial vehicle ("UAV") or a remote control device, the method comprising:
    determining whether a remote control distance between the UAV and the remote control device increases or decreases, including:
        detecting a current signal-to-noise ratio of a signal receiver of at least one of the UAV or the remote control device;
        comparing the current signal-to-noise ratio with a reference signal-to-noise ratio;
        determining that the remote control distance increases if the current signal-to-noise ratio is smaller than the reference signal-to-noise ratio; and
        determining that the remote control distance decreases if the current signal-to-noise ratio is greater than the reference signal-to-noise ratio;
    increasing or maintaining a signal transmission power of at least one of the UAV or the remote control device if the remote control distance increases; and
    decreasing or maintaining the signal transmission power of at least one of the UAV or the remote control device if the remote control distance decreases.

2. The method of claim 1, further comprising:
    detecting the remote control distance between the UAV and the remote control device.

3. The method of claim 2, wherein detecting the remote control distance between the UAV and the remote control device comprises:
    obtaining a horizontal distance of the UAV relative to the remote control device;
    obtaining a height of the UAV relative to the remote control device; and
    calculating the remote control distance based on the horizontal distance and the height.

4. The method of claim 2,
    wherein at least one of the UAV or the remote control device comprises a storage device configured to store a truth table including a distance range and a preset signal transmission power corresponding to the distance range, and wherein increasing or maintaining the signal transmission power of at least one of the UAV or the remote control device comprises controlling, based on the remote control distance and the distance range, at least one of the UAV or the remote control device to execute the preset signal transmission power; and/or
    wherein decreasing or maintaining the signal transmission power of at least one of the UAV or the remote control device comprises controlling, based on the remote control distance and the distance range, at least one of the UAV or the remote control device to execute the preset signal transmission power.

5. The method of claim 4, wherein the distance range and the preset signal transmission power in the truth table are obtained through a practical external field test.

6. The method of claim 2, wherein the following three steps are executed once at every first predetermined time interval: detecting the remote control distance between the UAV and the remote control device, determining whether the remote control distance between the UAV and the remote control device increases or decreases, and increasing or maintaining the signal transmission power of at least one of the UAV or the remote control device or decreasing or maintaining the signal transmission power of at least one of the UAV or the remote control device.

7. The method of claim 6, wherein the first predetermined time interval is a value obtained from a range of 0.001 second to 1 second.

8. The method of claim 1, wherein increasing or maintaining the signal transmission power of at least one of the UAV or the remote control device when the remote control distance increases comprises:
    adding a predetermined change value to a current signal transmission power to obtain an updated signal transmission power, and maintaining an updated current signal-to-noise ratio to be the reference signal-to-noise ratio.

9. The method of claim 1, wherein decreasing or maintaining the signal transmission power of at least one of the UAV or the remote control device if the remote control distance decreases comprises:
    calculating a current difference between the current signal-to-noise ratio and the reference signal-to-noise ratio;
    comparing the current difference and a predetermined difference;
    maintaining a current signal transmission power of at least one of the UAV or the remote control device unchanged if the current difference is smaller or equal to the predetermined difference; and
    reducing the current signal transmission power of at least one of the UAV or the remote control device by a predetermined change value to obtain an updated signal transmission power and maintaining an updated current signal-to-noise ratio to be the reference signal-to-noise ratio, if the current difference is greater than the predetermined difference.

10. The method of claim 8, wherein the reference signal-to-noise ratio is −4 dB to −2 dB.

11. The method of claim 8, wherein the reference signal-to-noise ratio is obtained through a practical external field test.

12. The method of claim 9, wherein the predetermined difference is from a range of 2 dB to 3 dB.

13. The method of claim 9, wherein the predetermined change value is obtained from a range of 0.5 dB to 1 dB.

14. The method of claim 1, wherein the following steps are executed once at every second predetermined time interval: the step of detecting the current signal-to-noise ratio of the signal receiver of at least one of the UAV or the remote control device to a step of obtaining an updated signal transmission power or to a step of maintaining a current signal transmission power of at least one of the UAV or the remote control device unchanged.

15. The method of claim 14, wherein the second predetermined time interval is obtained from a range of 0.001 second to 1 second.

16. An unmanned aerial vehicle ("UAV"), comprising:
a processor configured to:
determine whether a remote control distance between the UAV and a remote control device increases or decreases;
detect a current signal-to-noise ratio of a signal receiver of at least one of the UAV or the remote control device;
compare the current signal-to-noise ratio with a reference signal-to-noise ratio;
determine that the remote control distance increases if the current signal-to-noise ratio is smaller than the reference signal-to-noise ratio; and
determine that the remote control distance decreases if the current signal-to-noise ratio is greater than the reference signal-to-noise ratio; and
a transmitter configured to:
increase or maintain a signal transmission power of at least one of the UAV or the remote control device if the remote control distance increases; or
decrease or maintain the signal transmission power of at least one of the UAV or the remote control device if the remote control distance decreases.

17. The UAV of claim 16, further comprising:
a distance detector configured to detect the remote control distance between the UAV and the remote control device.

18. The UAV of claim 17, wherein the distance detector comprises:
a global positioning system configured to obtain a horizontal distance of the UAV relative to the remote control device;
a barometer configured to obtain a height of the UAV relative to the remote control device; and
a calculator configured to calculate the remote control distance based on the horizontal distance and the height.

19. A remote control device, comprising:
a processor configured to:
determine whether a remote control distance between an unmanned aerial vehicle ("UAV") and the remote control device increases or decreases;
detect a current signal-to-noise ratio of a signal receiver of at least one of the UAV or the remote control device;
compare the current signal-to-noise ratio with a reference signal-to-noise ratio;
determine that the remote control distance increases if the current signal-to-noise ratio is smaller than the reference signal-to-noise ratio; and
determine that the remote control distance decreases if the current signal-to-noise ratio is greater than the reference signal-to-noise ratio; and
a transmitter configured to:
increase or maintain a signal transmission power of at least one of the UAV or the remote control device if the remote control distance increases; or
decrease or maintain the signal transmission power of at least one of the UAV or the remote control device if the remote control distance decreases.

* * * * *